US005873244A

United States Patent [19]

Cobo et al.

[11] Patent Number: 5,873,244

[45] Date of Patent: Feb. 23, 1999

[54] POSITIVE FLOW CONTROL SYSTEM

[75] Inventors: Michael A. Cobo; Richard G. Ingram; Eric A. Reiners, all of Saint Charles; Matthew F. Vande Wiele, Peoria, all of Ill.

[73] Assignee: Caterpillar Inc., Peoria, Ill.

[21] Appl. No.: 976,152

[22] Filed: Nov. 21, 1997

[51] Int. Cl.[6] .......... F16D 31/02

[52] U.S. Cl. .......... 60/422; 60/452

[58] Field of Search .......... 60/422, 452

[56] References Cited

U.S. PATENT DOCUMENTS

| | | | |
|---|---|---|---|
| 4,197,705 | 4/1980 | Westveer . | |
| 4,408,453 | 10/1983 | Westveer . | |
| 4,437,307 | 3/1984 | Budzich . | |
| 4,479,349 | 10/1984 | Westveer . | |
| 4,712,376 | 12/1987 | Hadank et al. . | |
| 5,017,094 | 5/1991 | Graf et al. . | |
| 5,046,926 | 9/1991 | Deininger et al. . | |
| 5,237,819 | 8/1993 | Hopkins et al. . | |
| 5,277,027 | 1/1994 | Aoyagi et al. | 60/420 |
| 5,295,795 | 3/1994 | Yasuda et al. | 417/213 |
| 5,326,230 | 7/1994 | Fischer et al. . | |
| 5,421,155 | 6/1995 | Hirata et al. | 60/426 |
| 5,447,027 | 9/1995 | Ishikawa et al. | 60/420 |
| 5,528,911 | 6/1996 | Roth et al. . | |
| 5,535,587 | 7/1996 | Tanaka et al. . | |
| 5,575,148 | 11/1996 | Hirata et al. | 60/445 |

FOREIGN PATENT DOCUMENTS

| | | |
|---|---|---|
| 4-25850 | 9/1992 | Japan . |
| 4-258504 | 9/1992 | Japan . |
| WO9316285 | 8/1993 | WIPO . |

*Primary Examiner*—F. Daniel Lopez
*Attorney, Agent, or Firm*—J. W. Burrows

[57] ABSTRACT

A positive flow control system is provided that uses open-centered control valves in a series connection to provide priority between different fluid circuits and to provide requested flow regardless of the load pressure while minimizing unused or wasted flow. This is accomplished by providing a restriction in the last open-centered control valve to controllably restrict the flow therethrough when the valve is in its neutral position and having the source of pressurized fluid at a minimum displacement position that substantially matches the rate of flow across the restriction. A controller controls the displacement of the source of pressurized fluid and the displacement of the respective open-centered control valves in proportional to the respective input commands. Initial movement of the last open-centered control valve closes off the restricted flow thereacross to the reservoir prior to the source of pressurized fluid being communicated to the associated actuator. The subject system provides priority control and an effective control of wasted fluid while providing the needed flow rate regardless of the load without needing a special control arrangement for priority or separate bypass valve to control wasted flow.

7 Claims, 4 Drawing Sheets

POSITIVE FLOW CONTROL SYSTEM

TECHNICAL FIELD

This invention relates generally to a positive flow control system wherein the flow from the pump and the flow to the actuators through the valve is proportional to the flow requested by the operator through the control input and more particularly to a positive flow control system using open-centered valves.

BACKGROUND ART

Positive flow control systems are known that use closed-centered valves connected in parallel in combination with a separate by-pass valve to control the flow of fluid in the system in response to the operator's input command. These known positive flow control systems do not permit priority control without providing special controls. Furthermore, an extra bypass valve is required to control the flow from the pump whenever the control valves are in their closed positions. Even though the pumps may be flow/pressure compensated, it is desirable to maintain some minimum flow and pressure in order to have a supply of pressurized fluid for the system's control, for example; pilot control fluid, lubrication fluid or make-up fluid. It is also known, to place open-centered valves in an interrupted series relationship in order to provide priority flow to a desired function. For example, it may be desirable to ensure that the tilt actuator of a wheel loader have priority over the lift actuator. In these known open-centered systems, whenever the control valves are in their centered positions, all of the flow from the pump is passed therethrough to the reservoir. In earlier systems the pump may have been at maximum displacement and all of the energy needed to produce the flow is wasted. In subsequent systems, a flow restriction has been placed in the tank line downstream of the last control valve in the series in order to control the rate of flow to the reservoir. In order to offset the high increase in system pressure due to the addition of the restriction, the pressure drop across the restriction was sensed and used to control the displacement of the pump. This type of system has normally been referred to as negative flow control. Negative flow control systems rely on the exhausted flow in the system to control the flow rate from the pump. These types of systems still permit a large amount of fluid flow to return to the reservoir as the open-centered control valve is being moved to an actuated position.

It is desirable to minimize the volume of fluid flow that is permitted to be passed to the reservoir in order to minimize horsepower losses. It is also desirable to minimize flow losses while also providing priority to selected functions without the need for complicated controls.

The present invention is directed to overcoming one or more of the problems as set forth above.

DISCLOSURE OF THE INVENTION

In one aspect of the present invention a positive flow control system is provided and includes a variable displacement source of pressurized fluid having a displacement controller and being movable from a minimum displacement position towards a maximum displacement position in response to receipt of a control signal to the displacement controller. The system also includes first fluid circuit connected to the source of pressurized fluid. The first fluid circuit has a first actuator and a first open-centered control valve connected to the source of pressurized fluid and operative to control the flow of fluid from the source of pressurized fluid to the first actuator. The first open-centered control valve is movable from a neutral position, at which flow to the first actuator is blocked and flow towards the reservoir is open, towards first and second operative positions at which the flow towards the reservoir is progressively closed off and the flow to the first actuator is progressively opened. A second fluid circuit is connected to the first fluid circuit downstream thereof. The second fluid circuit has a second actuator and a second open-centered control valve connected to the source of pressurized fluid and operative to control the flow of fluid from the source of pressurized fluid to the second actuator. The second open-centered control valve is movable from a neutral position, at which flow to the second actuator is blocked and flow towards the reservoir is controllably restricted, towards first and second operative positions at which the flow towards the reservoir is initially substantially closed off and the flow to the first actuator is progressively opened. First and second input controllers are provided and each is operative to selectively generate control signals to control the displacement of the respective first and second open-centered control valves. The system further includes an electronic controller operative to receive the signals from the first and second input controllers and generate command signals to the displacement controller of the source of pressurized fluid and to the first and second open-centered control valves.

BRIEF DESCRIPTION OF THE DRAWINGS

FIG. 6 is a block diagram illustrating one example of phase conditioning.

BEST MODE FOR CARRYING OUT THE INVENTION

Figure 1:
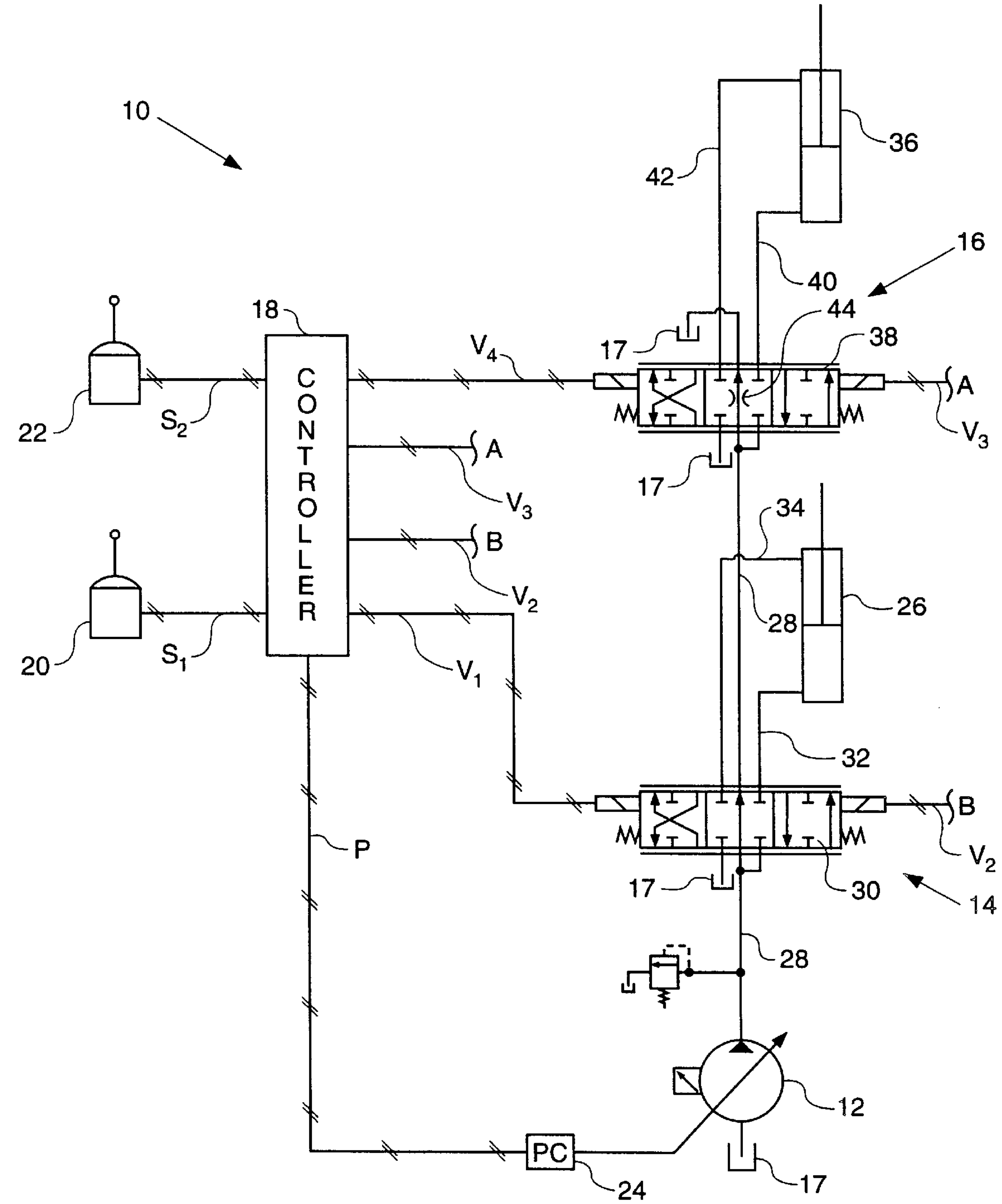
FIG. 1 is a schematic representation of a fluid system incorporating an embodiment of the subject invention.

Referring to the drawings and more specifically to FIG. 1, a positive flow control system 10 is illustrated. The positive flow control system includes a source of pressurized fluid, such as a variable displacement hydraulic pump 12, first and second fluid circuits 14,16, a reservoir 17, an electronic controller 18, and first and second input lever controllers 20,22.

The hydraulic pump 12 is operative from a minimum displacement position towards a maximum displacement position and is controlled therebetween by a displacement controller 24. The pump displacement controller 24 is responsive to receipt of an electrical command signal "P" from the electronic controller 18.

The first fluid circuit 14 includes a first actuator 26 operative to receive fluid from the hydraulic pump 12 through a supply conduit 28 and a first open-centered control valve 30. The first actuator 26 is connected to the first open-centered control valve 30 by conduits 32,34. The first open-centered control valve 30 of the subject embodiment is an electrically controlled proportional valve that is movable from a spring biased, neutral position towards first and second operative positions in response to receipt of electrical command signals $V_1$,$V_2$ from the electronic controller 18.

At the neutral position of the first open-centered control valve 30, the fluid flow from the hydraulic pump 12 is blocked from the first actuator 26 and is freely passed therethrough to the second fluid circuit 16 by the supply conduit 28. At the first and second operative positions, the fluid flow from the hydraulic pump 12 is in fluid communication with the first actuator 16 through the appropriate conduit 32,34 and the free flow through the control valve 30 to the downstream second circuit 16 is blocked. Whenever the control valve 30 is being operated between the neutral position and one of its first and second operative positions, a portion of the fluid flow from the hydraulic pump 12 is passed to the downstream second circuit 16.

The second fluid circuit 16 includes a second actuator 36 operative to receive fluid from the first fluid circuit 14 through the supply conduit 28 and a second open-centered control valve 38. The second actuator 36 is connected to the second open-centered control valve 38 by conduits 40,42. The second open-centered control valve 38 of the subject embodiment is also an electrically controlled proportional valve that is movable from a spring biased, neutral position towards first and second operative positions in response to receipt of electrical command signals $V_3$,$V_4$ from the electronic controller 18.

At the neutral position of the second open-centered control valve 38, the fluid flow from the supply conduit 28 is blocked from the second actuator 36 and the flow therethrough to the reservoir 17 is controllably restricted by a restriction 44. In the first and second operative positions, the fluid flow from the first fluid circuit 14 through the supply conduit 28 is in fluid communication with the second actuator 36 through the appropriate conduit 40,42 and the restricted flow through the second control valve 38 to the reservoir 17 is blocked. During an initial portion of the second control valve 38 being operated within one of its first and second operative positions, fluid limited flow is permitted through the restriction 44 to the reservoir 17. Thereafter, fluid flow through the restriction is blocked.

The electronic controller 18 receives input control signals $S_1$,$S_2$ from the respective first and second input lever controllers 20,22. The electronic controller 18 processes the signals and generate the respective command signals "P,$V_{1-4}$" to the pump displacement controller 24 and to the appropriate control valve 30,38. The displacement of the hydraulic pump 12 is moved to a position to provide the fluid flow that is needed to satisfy the inputs requested through the first and second input lever controllers 20,22. Likewise, the first and second open-centered control valves 30,38 are moved to the appropriate position to direct a fluid volume to the associated actuator 26/36 as required by the control signal generated by the respective first and second input lever controllers 20,22.

Figure 2:
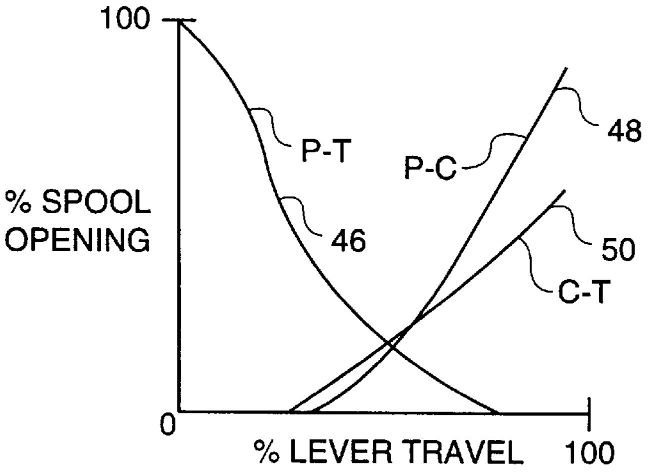
FIG. 2 is a chart graphically illustrating the relationship of the spool areas of a first open center control valve to control fluid flow from a source of pressurized fluid to an actuator/cylinder or reservoir dependent on an input lever travel.

Referring to FIG. 2, a graph is illustrated to depict the relationship between the lever movement of the first lever input controller 20 and the associated opening of the spool/valving element within the first open-centered control valve 30. The horizontal axis of the graph represents the percent of travel of the input lever 20 and the vertical axis represents the percent of opening of the valving element within the first control valve 30. For simplicity, only one quadrant is illustrated to show the relationship of the fluid flow as the control valve 30 is being moved from the neutral position to one of its operative positions. A mirror image of this graph would illustrate the flow relationship for the other operative position.

A line 46 represents the flow through the first open-centered control valve 30 to the downstream second fluid circuit 16 (P-T) as the first control valve 30 is being moved from the neutral position towards one of its first or second operative positions. The movement of the first control valve 30 is directly proportional to the movement of the associated input lever 20. As illustrated by the "P-T" line 46, movement of the first control valve 30 away from its centered position progressively closes off the flow to the downstream second fluid circuit 16.

A line 48 represents the flow of fluid from the hydraulic pump 12 through the first open-centered control valve 30 to the actuator/cylinder 26 (P-C) during one of the first and second operative positions. As noted the first control valve 30 is moved a predetermined distance from its centered position prior to the hydraulic pump opening to the actuator 26. This is normally referred to as the deadband of the control valve. Additionally, as the flow is being directed/metered to the first actuator 26, the flow through the first control valve 30 to the downstream second fluid circuit 16 is being progressively shut off. Any flow that is being passed to the second fluid circuit 16 can be used by the second fluid circuit or controllably passed to the reservoir 17 across the restriction 44.

A line 50 represents the flow of fluid from the first actuator to the reservoir/tank 17 (C-T). As is typical to alleviate back pressure, the "C-T" port is initially opened to the reservoir 17 just prior to the hydraulic pump 12 communicating with the first actuator 26.

Figure 3:
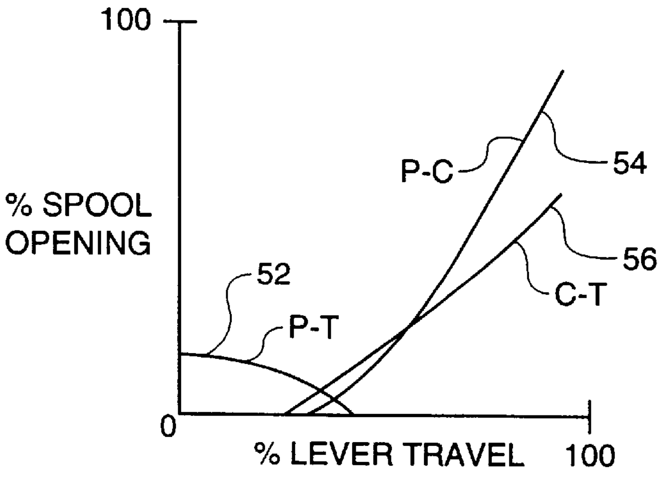
FIG. 3 is a chart graphically illustrating the relationship of the spool areas of a second open center control valve to control fluid flow from the source of pressurized fluid to another actuator/cylinder or reservoir dependent on another input lever travel.

Referring to FIG. 3, a graph is illustrated to depict the relationship between the lever movement of the second lever input controller 22 and the associated opening of the spool/valving element within the second open-centered control valve 38. As noted with respect to FIG. 2, the horizontal axis of the graph represents the percent of travel of the input lever 22 and the vertical axis represents the percent of opening of the second control valve 38. As noted above with respect to FIG. 2, only one quadrant is illustrated to show the flow relationship for the second control valve 38.

A line 52 represents the restricted flow through the restriction 44 of the second open-centered control valve 38 as it is being moved from the neutral position towards one of its first or second operative positions. As compared with the "P-T" line 46 of FIG. 2, the fluid flow across the second control valve 38 in its centered position is substantially less than that of the first control valve 30. Additionally, the flow through the restriction 44 is substantially closed off at the time the hydraulic pump 12 is communicated with the second actuator/cylinder 36. This is best illustrated by a line 54 in FIG. 3. As previously noted with respect to FIG. 2, the movement of the second control valve 38 is directly proportional to the movement of the associated input lever 22. As illustrated by the "P-T" line 52 and the "P-C" line 54, initial operation of the second control valve 38 in one of its first or second operative positions there is a small amount of fluid being directed to the reservoir 17. For the remainder of the operation of the second control valve 38 in the first or second operative positions, all of the fluid flow across the restriction 44 to the reservoir 17 is blocked.

Likewise, as set forth with respect to FIG. 2, a line 56 in FIG. 3 illustrates the relationship of the flow from the second actuator to the reservoir 17 when the second control valve 38 is being operated in one of its first or second operative positions.

Figure 4:
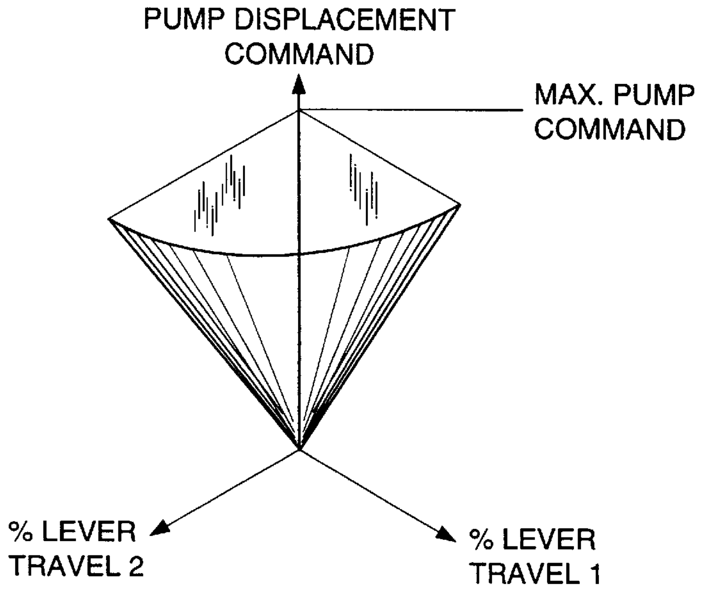
FIG. 4 is a map illustrating the displacement of a hydraulic pump relative to the input lever travel of respective controller input commands.

Referring to FIG. 4, a control map is illustrated to depict the relationship between the pump displacement command versus lever movements of the first and second lever input controllers 20,22. The one horizontal axis represents the percent of lever travel of the first input lever controller 20. The other horizontal axis represents the percent lever travel of the second input lever controller 22 while the vertical axis represents the pump displacement command associated with any given combination of lever inputs from the first and second input lever controllers 20,22. The control map as illustrated is generally an isometric view. The shape of the control map with respect to the axes is basically one fourth of an invert cone with the point of the cone setting on the vertex of the axes. The one horizontal axis being along one side of the quarter section of the inverted cone shape and the other horizontal axis being along the other side thereof. The vertical axis of the control map lying along the central axis of the inverted cone. Even though the map of FIG. 4 is illustrated as a portion of an inverted cone, it is recognized that the shape of the control map could be varied from that shown without departing from the essence of the subject invention.

It is recognized that the relationships depicted in FIGS. 2–4 represent steady state operating conditions wherein movement of the control valves and the change in pump displacement take place without the system being subjected to pressure excursions, such as pressure spikes, either up or down. The positive flow control system described herein will also operate under non-steady state or dynamic conditions. Under these conditions, it may be necessary to provide additional conditioning of the first and second control valve command signals and the pump displacement command signal to provide proper actuation phasing of the first and second control valves 26,38 and the displacement of the pump 12 to minimize the pressure excursions resulting from unmatched dynamic characteristics of the first and/or second control valves 26,38 and the displacement of the pump 12.

Figure 5:
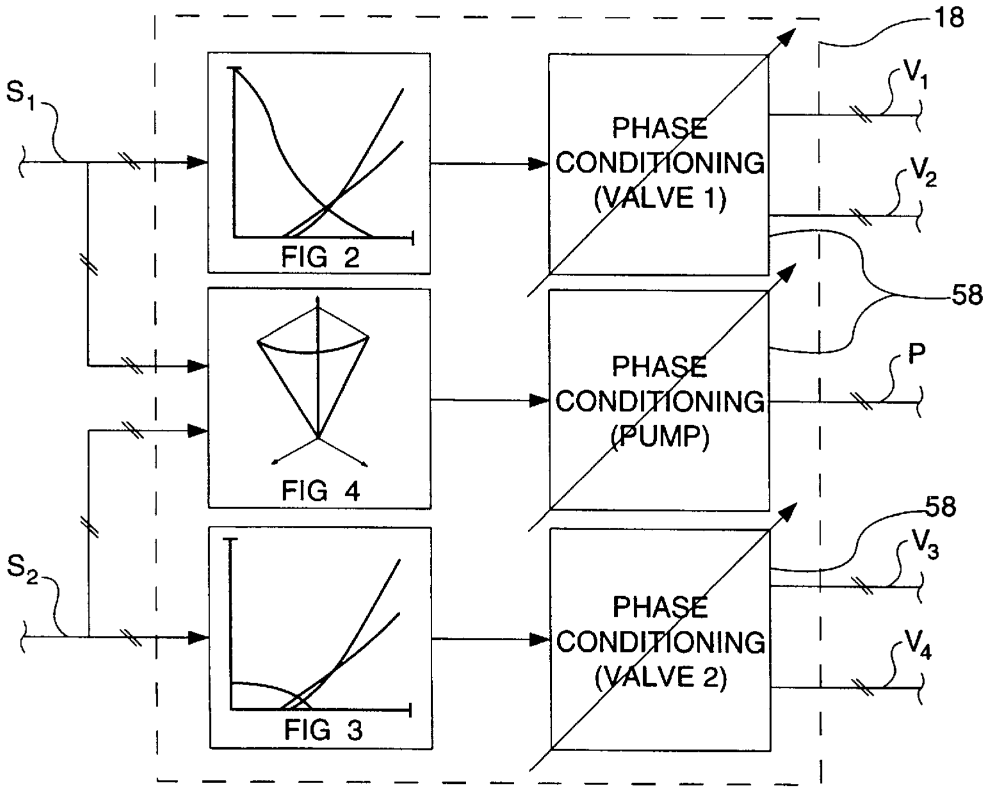
FIG. 5 is a block diagram illustrating the phase conditioning within an electronic controller of the controller input commands.
Figure 5:
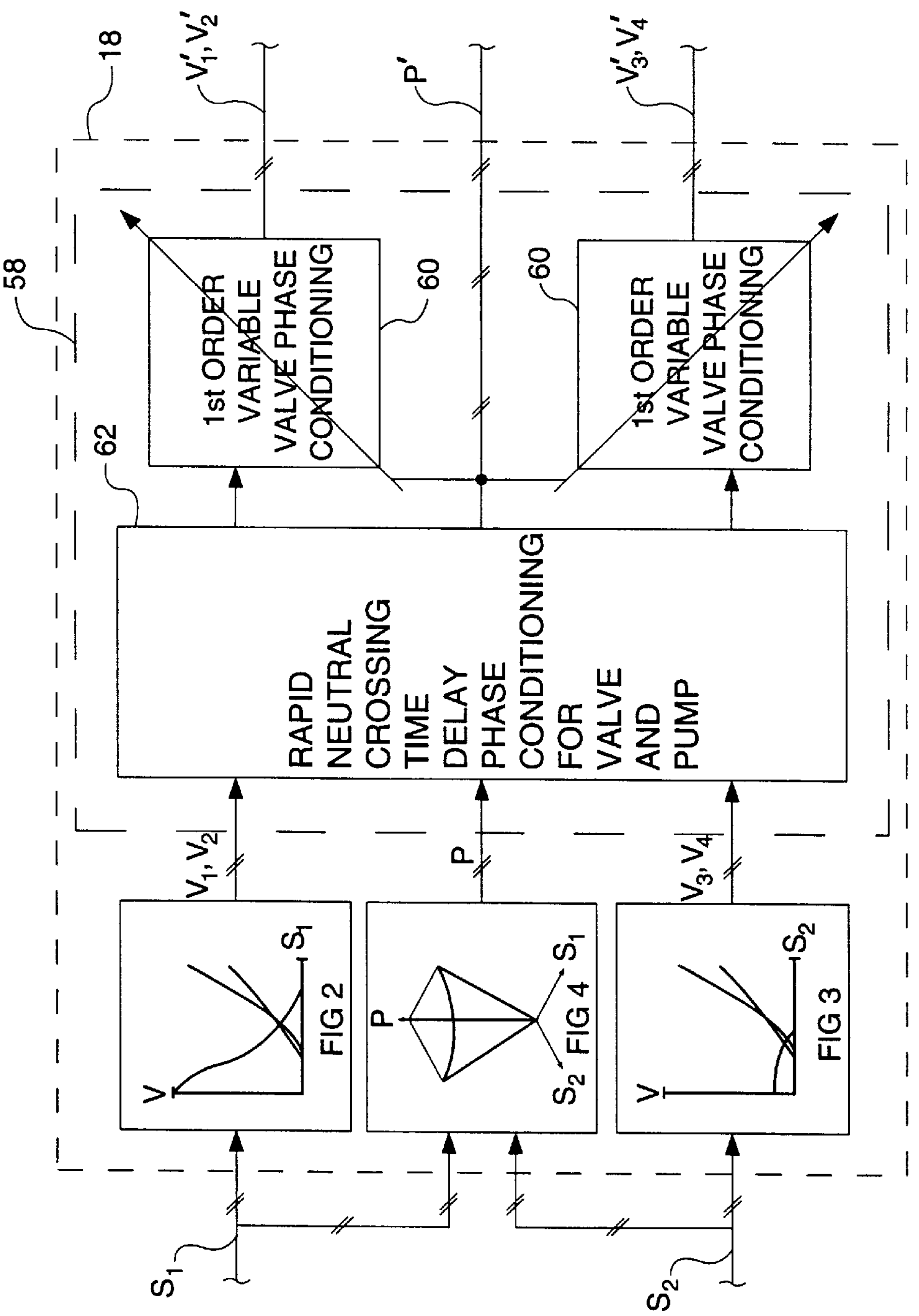

Referring to FIG. 5, a block diagram is illustrated to depict the location of the phase conditioning with respect to the graphs of FIGS. 2–4 that can be implemented to alleviate the pressure excursions noted above. A phase conditioning block 58 may be placed in the electronic controller 18 to further condition the signals $S_1$,$S_2$ from the respective input lever controllers 20,22. The phase conditioning may take many forms depending on the dynamic characteristics of the displacement changing mechanism of the pump 12 and the movement of the valving elements in the first and second control valves 26,38 that are used in the subject positive flow control system 10. It also may be necessary to have a phase conditioning block in the processing of the pump's displacement command signal "P". These may include but are not limited to fixed or variable and analog or digital, filters, rate limits, or pure time delays.

Referring to FIG. 6, a block diagram is illustrated and defines one example of how to provide phase conditioning in the electronic controller 18 of a positive flow control system. The subject example involves a positive flow control system where the dynamic characteristics of the pump are slower than the dynamic characteristics of the control valve. In this arrangement if the input lever controller is moved to neutral from a high displacement position, a pressure spike may result. The pressure spike occurs because the control valve moves to its neutral, centered position faster than the displacement of the pump reducing to its minimum displacement position. Since the restriction 44 in the second control valve 38 is sized to permit free flow only when the pump 12 is at its minimum flow, standby position, the extra flow has no place to go and a pressure spike results. The excessive flow is sent to the valve for a period of time proportional to the difference in response times of the control valve and the pump. If this difference is small, a small pressure spike occurs, but if the difference is long, a large pressure spike occurs.

To minimize this difference, a first order digital filter 60 is added in the phase conditioning block 58 of the control valve signals $V_{1-4}$ to degrade the response of the control valve to more properly match the pump's response characteristics. Furthermore, the filter could be made to vary it's characteristics as a function of the pump up-stroke or de-stroke direction since the pump's dynamic characteristics can vary when increasing or decreasing flow output. It is also envisioned that the filters could be made to vary as a function of pump output pressure, oil temperature or other system parameters.

Additionally, pressure spikes can be generated when crossing the neutral position from one high flow position towards the other maximum position. In commanding one extreme to the other, the pump is required to de-stroke from one high flow position to minimum flow and then up-stroke towards another high flow position. At the same time, the control valve moves from its high displacement position to neutral and back towards another high displacement position. During such a rapid command sequence, the pump command remains substantially at it's maximum value dipping to the minimum position for the short time required by the input lever command to cross neutral. The pump's slow response characteristics in changing displacement and substantially a constant maximum command signal do not allow the pump's displacement to track the pump command while the valves move form one extreme to the other across neutral. Since the pump does not reach minimum position when the control valves cross the neutral position, a pressure spike is produced due to the excessive flow being directed to the restriction 44. To alleviate this problem, a variable time delay block 62 is added to the command signals from the controller to the control valves 30,38 and the pump displacement controller 24 to constrain the command signals near neutral for a longer period of time. This time delay allows the pump to reach its minimum displacement position prior to continuing on to the maximum position at the control valves other high displacement position. It is recognized that the delay could monitor current and previous control valve command signals to determine when rapid neutral crossings have occurred and trigger a time delay. It is also envisioned that the time delay could be triggered off of lever command rates or other system parameters.

It is recognized that the shape of the lines 46,48,50, of FIG. 2 and the lines 52,54,56 of FIG. 3 could be changed in order to provide different operating characteristics for the fluid system 10 without departing from the essence of the subject invention. Also, it is recognized that the overlap between the lines 52 and 54 of FIG. 3 could be increased some or reduced to substantially zero. Additionally, even though only two fluid circuits 14,16 is disclosed herein, it is recognized that more than two could be utilized. If more than two fluid circuits are being used in series, the open-centered control valve of only the last fluid circuit would have the restriction 44 disposed in the neutral position of the control valve.

INDUSTRIAL APPLICABILITY

During the operation of the subject positive flow control system, movement of the first input lever controller 20 directs the signal $S_1$ to the electronic controller 18. The controller 18 processes the signal $S_1$ to determine the desired direction and magnitude of actuator travel dictated by the input lever and directs the appropriate signal $V_1/V_2$ to the first control valve 30. The resulting flow relationship is best illustrated by reference to the graph of FIG. 2. The first control valve 30 moves from the centered position towards one of its operative positions. The line 46 illustrates that the initial movement of the control valve 30 begins closing the opening therethrough to the downstream second fluid circuit 16. The line 48 illustrates the communication of the hydraulic pump 12 with the first actuator 26. The initial movement of the control valve 30 prior to opening of the hydraulic pump 12 to the first actuator 26 is the deadband. Simultaneously with the signal being directed to the first control valve 30, the signal "P" is directed to the pump displacement controller 24. The signal "P" is proportional to the signal $S_1$ from the first input lever controller 20 so that the displacement of the hydraulic pump 12 is increased to provide the required amount of fluid to the first control valve 30 to satisfy the requirement dictated by the first input lever controller 20. Once the first input lever controller 20 is returned to its centered position, the first control valve 30 is likewise returned to its centered position and simultaneously the fluid from the hydraulic pump 12 is reduced to its minimum output flow.

Movement of the second input lever controller 22 directs the signal $S_2$ to the controller 18 that is proportional to the movement of the input lever. As noted with respect to the control of the first fluid circuit 14, the controller 18 processes the input signal $S_2$ and directs an appropriate signal $V_3/V_4$ to the second control valve 38 moving it towards one of its operative positions as dictated by the input lever controller 22.

As illustrated by the line 52 of the graph in FIG. 3, the restricted flow of fluid through the control valve 38 to the reservoir 17 is progressively closed off prior to the fluid from the first fluid circuit 14 being communicated with the second actuator 36. Line 54 in combination with line 52 illustrates the described relationship. The amount of flow permitted to pass across the restriction 44 is substantially less than that permitted to pass through the neutral position of the first control valve 30. This is more clearly shown by comparing the initiation of the lines 46 and 52.

At the same time that the signal is being directed from the controller 18 to the second control valve 38, the signal "P" is being directed to the pump displacement controller 24. The signal "P" to the pump controller 24 is proportional to the input signal $S_2$ from the second input lever controller 22 so that the displacement of the hydraulic pump 12 is adjusted to deliver the proper quantity of fluid to satisfy the requirement dictated by the input lever controller 22.

Movement of the input lever controller 22 to its neutral, centered position permits the second control valve 38 to return to its neutral position and at the same time the signal "P" to the pump controller is interrupted thus changing the displacement of the hydraulic 12 to its minimum standby position.

If both of the input lever controllers 20,22 are actuated at the same time, the first fluid circuit 14 has priority of the flow from the hydraulic pump 12. If the first input lever controller 20 is requesting a limited flow, then extra flow is permitted to pass downstream to the second circuit 16. The electronic controller 18 processes both of the input signals $S_1$,$S_2$ to determine the quantity of fluid needed to satisfy the requirements of both the first and second circuits 14,16. The signal "P" delivered to the pump displacement controller 24 acts to adjust the displacement of the hydraulic pump 12 to that necessary to deliver the needed flow therefrom.

As noted previously and illustrated in FIGS. 5 and 6, if the dynamic characteristics of the pump controls and the control valves are not matched, it is necessary to provide phase conditioning within the electronic controller 18. This phase conditioning functions to provide an additional control over the command signals from the controller 18 to the control valves 30,36 and/or the pump displacement controller 24 so that their respective responses to a change in the input lever controllers 20,22 are closely matched. That is, that the flow volume from the pump 12 is substantially equal to that required by the displacement position of the respective control valves 30,38 either singularly or in combination. Additionally, the phase conditioning provides a time delay for the command signals $V_{1-4}$, "P" to the respective control valves 30,38 and the pump displacement controller 24 whenever the input lever controllers require a change in direction of large amounts of flow. This permits the displacement of the pump 12 to reach its minimum displacement before it stroke back up to provide the large volume of flow for the opposite direction.

In view of the foregoing, it is readily apparent that the subject positive flow control system 10 provides a priority system while also providing the requested flow regardless of the load pressure without having to use special control schemes or an extra bypass valves.

Other aspects, objects and advantages of this invention can be obtained from a study of the drawings, the disclosure and the appended claims.

We claim:

1. A positive flow control system comprising:

a variable displacement source of pressurized fluid having a displacement controller and being movable from a minimum displacement position towards a maximum displacement position in response to receipt of a control signal to the displacement controller;

a first fluid circuit connected to the source of pressurized fluid, the first fluid circuit having a first actuator and a first open-centered control valve connected to the source of pressurized fluid and operative to control the flow of fluid from the source of pressurized fluid to the first actuator, the first open-centered control valve is movable from a neutral position, at which flow to the first actuator is blocked and flow through a bypass passage connecting the pump and the reservoir is open, towards first and second operative positions at which the flow towards the reservoir is progressively closed off and the flow to the first actuator is progressively opened;

a second fluid circuit connected to the first fluid circuit downstream thereof, the second fluid circuit having a second actuator and a second open-centered control valve connected to the source of pressurized fluid and operative to control the flow of fluid from the source of pressurized fluid to the second actuator, the second open-centered control valve is movable from a neutral position, at which flow to the second actuator is blocked and flow towards the reservoir is controllably restricted, towards first and second operative positions at which the flow towards the reservoir is initially substantially closed off and the flow to the second actuator is progressively opened;

first and second input lever controllers operative to selectively generate control signals to control the displacement of the respective first and second open-centered control valves; and an electronic controller operative to receive the signals from the first and second input lever controllers and generate command signals to the displacement controller of the source of pressurized fluid and to the first and second open-centered control valves.

2. The positive flow control system of claim 1 wherein the first and second open-centered control valves are three position, electrically controlled, proportional valves that are spring biased to their neutral positions and movable towards their first and second operative positions in response to receipt of a command signal from the electronic controller.

3. The positive flow control system of claim 2 wherein the restriction within the neutral position of the second open-centered control valve is of a size to substantially permit unrestricted flow of the fluid from the source of pressurized fluid when the source is at its minimum displacement position.

4. The positive flow control system of claim 3 wherein during movement of the second open-centered control valve from its neutral position towards one of its operative positions, the flow across the restriction in the neutral position is substantially closed prior to flow being directed from the source of pressurized fluid to the second actuator.

5. The positive flow control system of claim 4 wherein the respective first and second open-centered control valves are moved to a displacement position proportional to the associated input lever controller command.

6. The positive flow control system of claim 5 wherein the displacement of the source of pressurized fluid is controlled by the controller proportionally to the displacement requirements of the first and second open-centered control valves.

7. The positive flow control system of claim 4 wherein dynamic characteristics of the source of pressurized fluid and the first and second open-centered control valves do not permit each to move to its commanded position in the same amount of time and the command signals to the pump displacement controller and the first and second open-centered control valves are conditioned to provide actuation phasing of the pump displacement controller and the first and second open-centered control valves to minimize pressure excursions that result from unmatched dynamic characteristics.

* * * * *